(12) United States Patent
Chen et al.

(10) Patent No.: US 7,639,506 B2
(45) Date of Patent: Dec. 29, 2009

(54) MOUNTING APPARATUS FOR POWER SUPPLY

(75) Inventors: Yun-Lung Chen, Shenzhen (CN); Jun Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 532 days.

(21) Appl. No.: 11/308,943

(22) Filed: May 29, 2006

(65) Prior Publication Data

US 2007/0139902 A1 Jun. 21, 2007

(30) Foreign Application Priority Data

Dec. 20, 2005 (CN) ............ 200520120947

(51) Int. Cl.
*H05K 7/12* (2006.01)
(52) U.S. Cl. .............. 361/747; 361/726; 361/732; 361/759; 361/801; 312/223.2
(58) Field of Classification Search ........... 361/726, 361/732, 747, 759, 801, 807; 312/223.2, 312/223.3
See application file for complete search history.

(56) References Cited

U.S. PATENT DOCUMENTS

| 5,790,372 | A |  | 8/1998 | Dewey et al. |
| 6,582,150 | B1 | * | 6/2003 | Davis et al. ............... 403/330 |
| 6,761,273 | B1 | * | 7/2004 | Chen et al. ............... 211/41.17 |
| 6,801,435 | B1 | * | 10/2004 | Su et al. .................... 361/747 |
| 7,079,392 | B2 | * | 7/2006 | Berens et al. ............ 361/695 |

\* cited by examiner

*Primary Examiner*—Dameon E Levi
(74) *Attorney, Agent, or Firm*—Wei Te Chung (57) ABSTRACT

A mounting assembly includes a chassis having a bottom wall forming a plurality of securing members, a blocking piece attached to the bottom wall of the chassis and deflectable downwards, a power supply, and an actuating member movably mounted on the power supply. The power supply includes a bottom wall defining a plurality of securing opening for the securing members of the chassis engaging therein and a blocking step abutting against the elastic blocking piece for limiting a horizontal movement of the power supply. The actuating member forms a pressing portion corresponding to the blocking piece. When the actuating member is pushed, the pressing portion of the actuating member depresses the blocking member to free the power supply.

15 Claims, 8 Drawing Sheets

MOUNTING APPARATUS FOR POWER SUPPLY

FIELD OF THE INVENTION

The present invention relates to mounting apparatuses, and more particularly to a mounting apparatus for a power supply in a computer chassis.

DESCRIPTION OF RELATED ART

Computer systems, such as personal computers or computer servers generally include a power supply mounted in a housing or chassis along with other components and peripheral devices. Since the power supply receives alternating current and converts the alternating current to direct current for operating the various electrical components; safety regulations require that the power supply be completely enclosed in a case to prevent access to potentially harmful high voltages. For example, a conventional computer enclosure has a rear panel forming an opening in an upper portion thereof for mounting a switching power supply therein. Several holes are defined proximate the opening and are aligned with corresponding holes of the power supply for fixing the power supply to the computer enclosure. The power supply is mounted in the chassis by a plurality of screws passing through the holes of the rear panel and the power supply, making it difficult and time consuming to replace or remove the power supply for repair.

Accordingly, what is needed is a mounting apparatus for a power supply easily to be attached and removed from the chassis.

SUMMARY OF INVENTION

A mounting assembly includes a chassis having a bottom wall forming a plurality of securing members, a blocking piece attached to the bottom wall of the chassis and deflectable downwards, a power supply, and an actuating member movably mounted on the power supply. The power supply includes a bottom wall defining a plurality of securing openings for the securing members of the chassis engaging therein and a blocking step abutting against the blocking piece for limiting a horizontal movement of the power supply. The actuating member forms a pressing portion corresponding to the blocking piece. When the actuating member is pushed, the pressing portion of the actuating member depresses the blocking member to free the power supply.

Other advantages and novel features of the present invention will be drawn from the following detailed description of preferred embodiment with attached drawings, in which:

DETAILED DESCRIPTION

Figure 1:
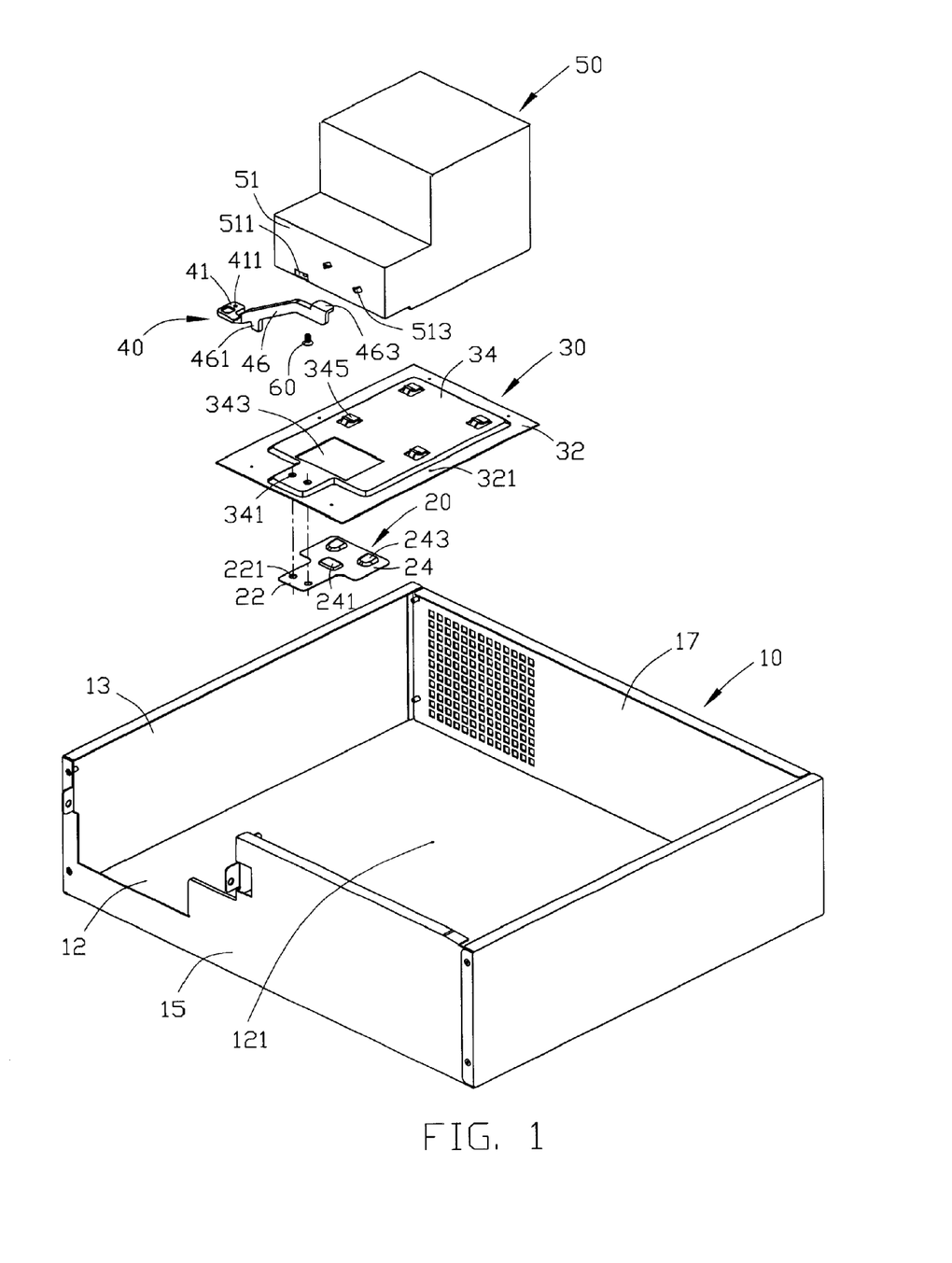
FIG. 1 is an exploded isometric view of the preferred embodiment of a mounting apparatus for a computer power supply, the mounting apparatus including a chassis, an elastic blocking piece, a carrying board, and an elastic actuating member.
Figure 2:
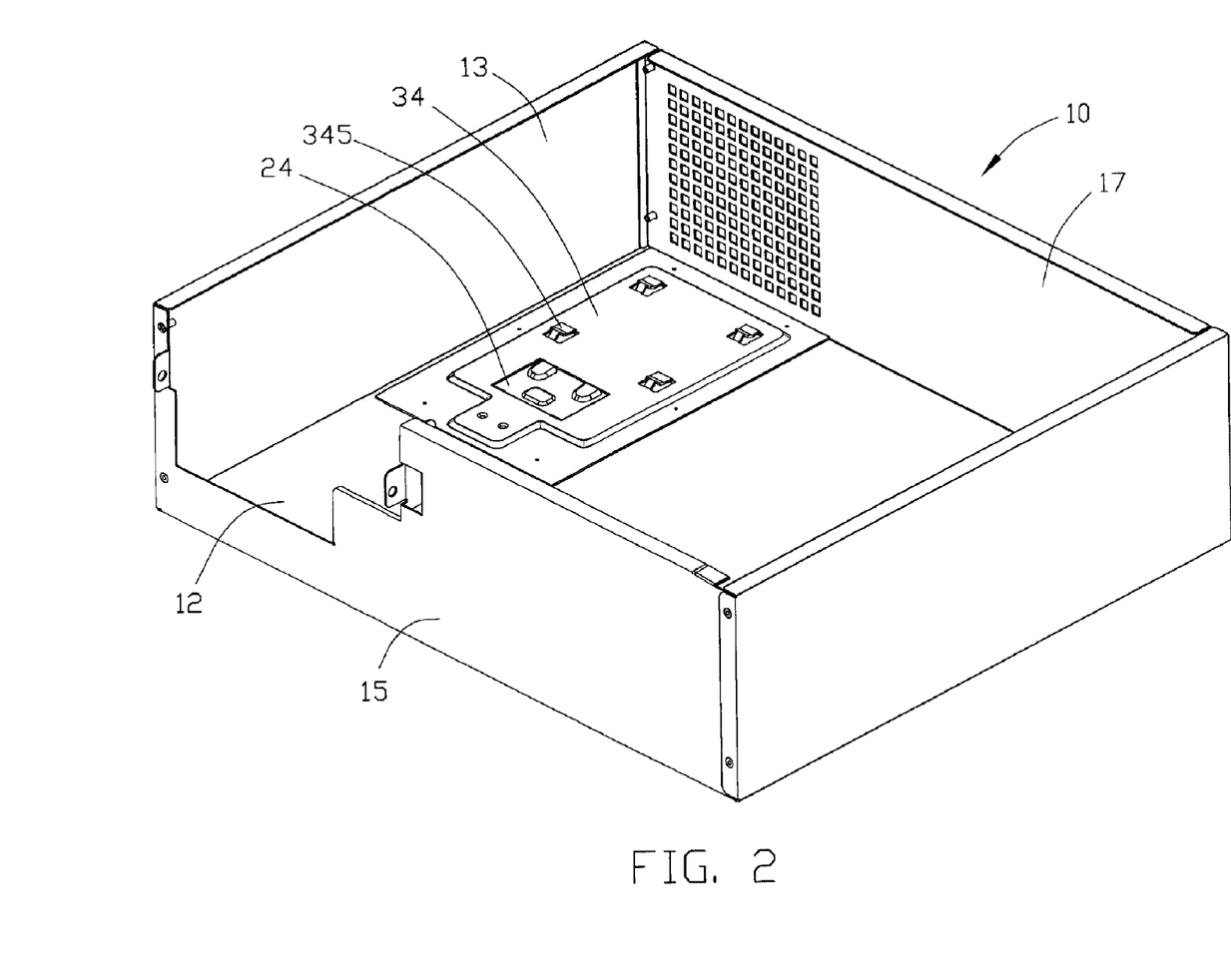
FIG. 2 is an assembled view of the chassis, the blocking piece, and the carrying board in FIG. 1.

Referring to FIGS. 1 and 2, a mounting apparatus for mounting a functional component like a power supply 50 in a computer or other electronic device in accordance with the preferred embodiment includes a chassis 10, an elastic blocking piece 20, a carrying board 30, and an elastic actuating member 40 mounted on the power supply 50.

The chassis 10 is formed by a bottom wall 12 defining a plurality of welding spots 121, a pair of side walls 13, a front panel 15, and a rear panel 17.

The elastic blocking piece 20 includes a base panel 22 defining a pair of riveting holes 221 at one free end. A pair of blocking portions 243 respectively protrudes up from the base panel 22 at an opposite end relative to the riveting holes 221. A protuberance 241 projects up from the base panel 22 at a middle portion.

The carrying board 30 includes a rectangular plate 32 and a receiving portion 34 protruding up from the rectangular plate 32. A plurality of welding spots 321 is defined on the rectangular plate 32 corresponding to the welding spots 121 on the bottom wall 12 of the chassis 10. The carrying board 30 is fastened on the bottom wall 12 of the chassis 10, with the use of the welding spots 121 and 321. A pair of riveting portions 341 is formed at a front portion corresponding to the riveting holes 221 of the elastic blocking piece 20, for riveting the elastic blocking piece 20 to the carrying board 30. An opening 343 is defined in the receiving portion 34 for receiving the blocking portions 243 and the elastic protuberance 241. A plurality of securing members 345 is formed on the receiving portion 34.

The elastic actuating member 40 includes a head portion 41 and a flexural shaft 46 extending from the head portion 41. A securing hole 411 is defined in the head portion 41. A pressing tab 461 extends down from a bottom of the flexural shaft 46. An operating handle 463 extends laterally from the top end portion of the shaft 46.

Figure 3:
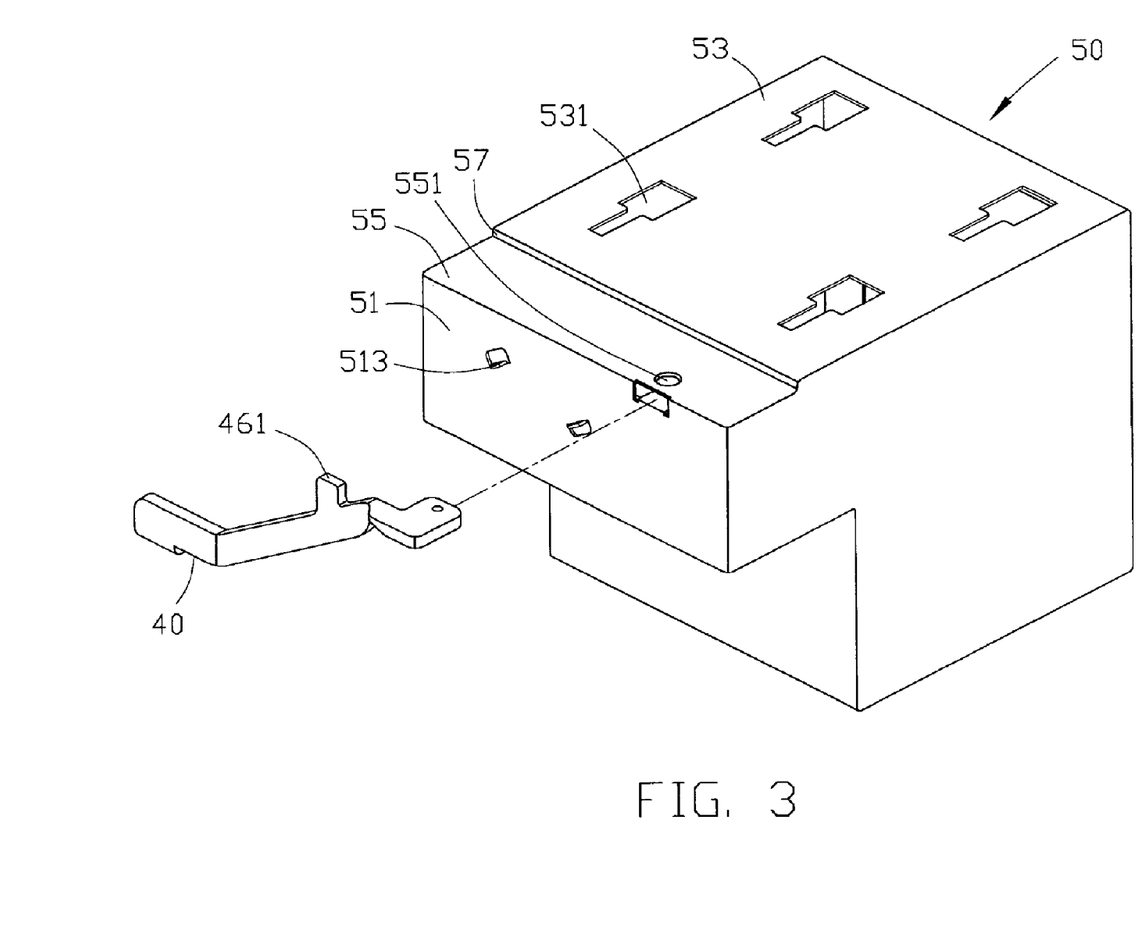
FIG. 3 is an exploded isometric view of the power supply and the elastic actuating member of FIG. 1, but viewed from another aspect.

Referring also to FIG. 3, the power supply 50 includes a side wall 51 and a first bottom wall 53. A plurality of securing openings 531 is defined in the first bottom wall 53. The front portion of the first bottom wall 53 is recessed to form a second bottom wall 55. The connecting portion between the first bottom wall 53 and the second bottom wall 55 forms a blocking step 57. A securing hole 551 is defined in the second bottom wall 55 for a fastener 60 to be received therein. An opening 511 is defined in the bottom edge of the side wall 52. When the head portion 41 of the elastic actuating member 40 is inserted in the opening 511, the securing hole 411 of the head portion is in alignment with the securing hole 551 of the second bottom wall 55. A pair of tabs 513 is stamped outward from the side wall 51 for preventing the elastic actuating member 40 from moving too much.

Figure 4:
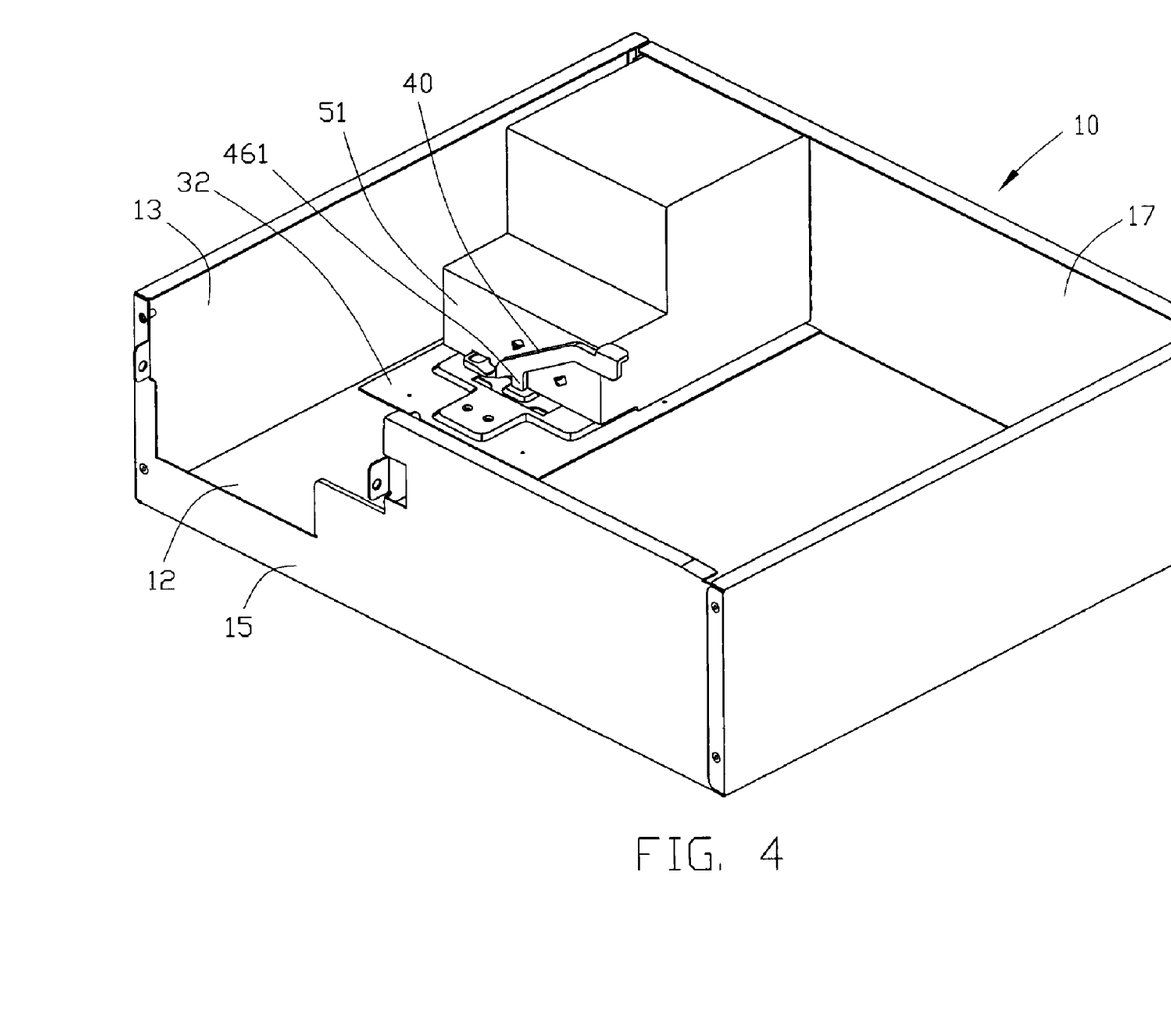
FIG. 4 is an assembled view of the mounting apparatus of FIG. 1.

In assembly, the elastic blocking piece 20 is riveted under the carrying board 30. The blocking portions 243 of the elastic blocking piece 20 protrude from the opening 343. The carrying board 30 is welded to the bottom wall 12 of the chassis 10 near the rear panel 17. The head portion 41 of the elastic actuating member 40 is inserted into the opening 511 of the power supply 50. The fastener 60 passes through the securing holes 551 and 411 respectively to secure the elastic actuating member 40 in the power supply 50. Then, the power supply 50 is pushed to move along the carrying board 30 toward the rear panel 17 of the chassis 10 for engaging with the securing members 345. Simultaneously, the first bottom wall 53 of the power supply 50 slides over the blocking portions 243 of the elastic blocking piece 20. When the securing opening 531 of the power supply 50 completely engages into the securing members 345 of the carrying board 30, the blocking step 57 of the power supply 50 is blocked by an edge of each of the blocking portions 243 of the elastic blocking piece 20, for limiting a horizontal movement toward the front panel 15. Thus, the power supply 50 is firmly secured in its assembled condition relative to the chassis 10 as shown in FIG. 4.

To remove the power supply 50 from the chassis 10 for repair or replacement, the operating handle 463 of the elastic actuating member 40 is pressed down so that the pressing tab 461 depresses the protuberance 241 of the blocking piece 20, thereby urging the blocking portion 243 of the elastic blocking piece 20 to lower. When the blocking piece 20 lowers to a position that a top surface thereof is lower than the receiving portion 34, the power supply 50 is pulled away from the rear panel 17. Then the securing openings 531 of the power supply 50 disengage from the securing members 345, thereby removing the power supply 50 from the chassis 10.

Figure 5:
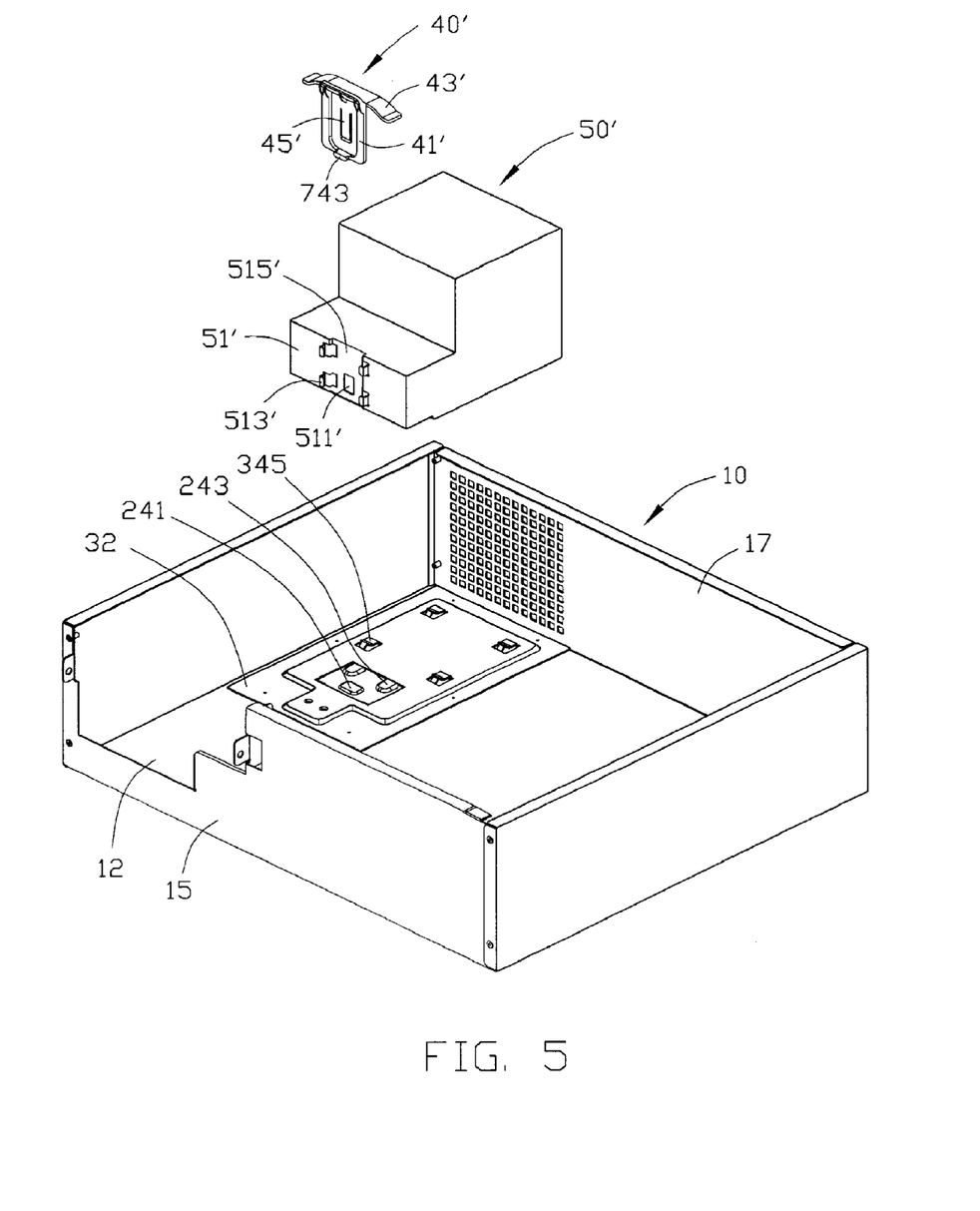
FIG. 5 is an exploded isometric view of an alternative embodiment of a mounting apparatus for a computer power supply of FIG. 1, the mounting apparatus including a chassis, an elastic blocking piece, a carrying board, and an elastic actuating member.
Figure 6:
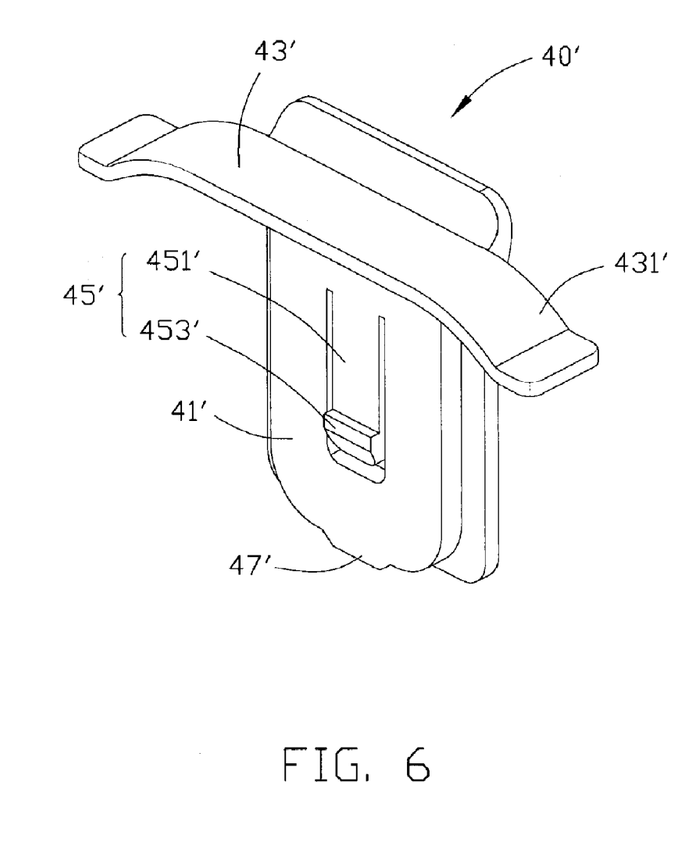
FIG. 6 is an enlarged isometric view of the elastic actuating member in FIG. 5, but viewed from another aspect.
Figure 7:
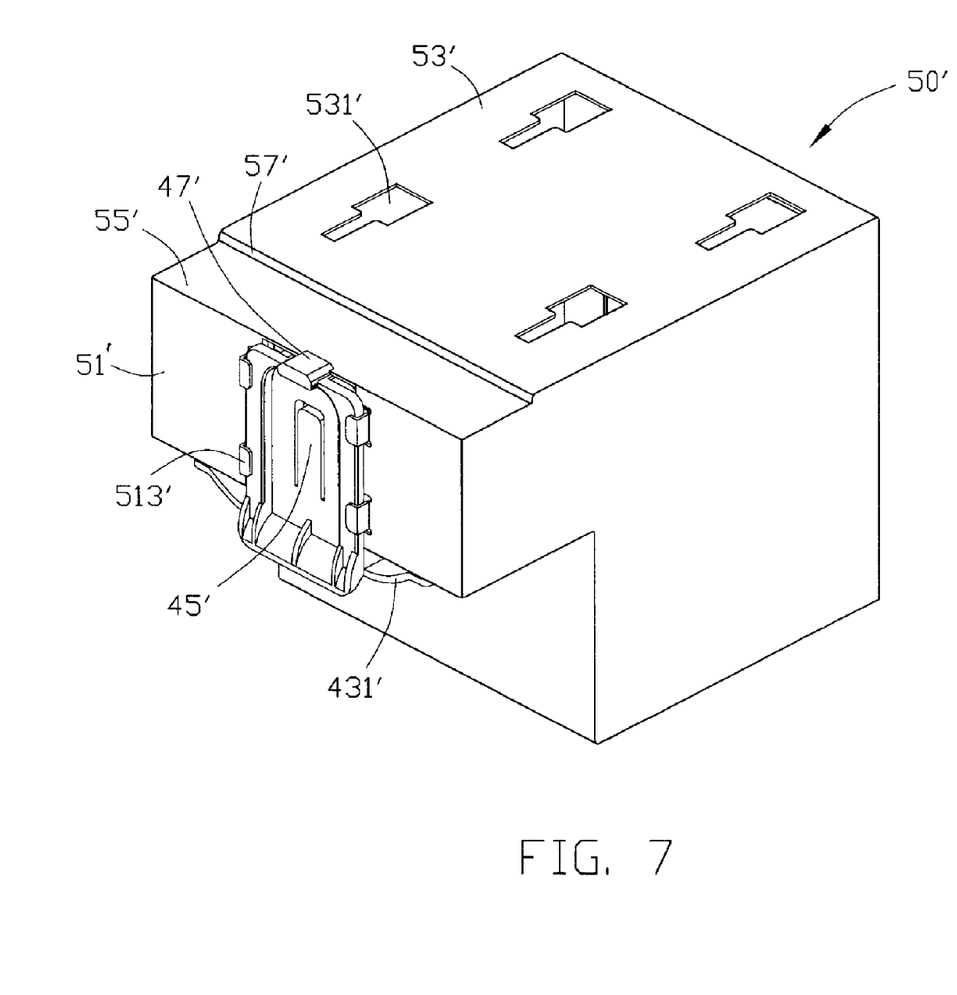
FIG. 7 is an assembled view of the power supply and the elastic actuating member of FIG. 5, but viewed from another aspect.

Referring to FIG. 5, in an alternative embodiment of the present invention, the chassis 10, the elastic blocking piece 20, and the carrying board 30 are the same as those of the preferred embodiment. The elastic actuating member 40' includes a rectangular base portion 41' and an arcuate transversal bar 43' having two free ends 431' connected to a top edge of the base portion 41'. An elastic hook 45' is formed in a middle of the base portion 41'. Referring to FIG. 6, the elastic hook 45' includes an elastic trunk 451' and a claw 453' formed at a free end of the elastic trunk 451'. A pressing portion 47' is disposed at a bottom of the base portion 41' for pressing the blocking member 20. Referring also to FIG. 7, the power supply 50' includes a side wall 51' and a first bottom wall 53'. A plurality of securing openings 531' is defined in the first bottom wall 53'. The front portion of the first bottom wall 53' is recessed to form a second bottom wall 55'. The connecting portion between the first bottom wall 53' and the second bottom wall 55' forms a blocking step 57'. An opening 511' is defined in the side wall 51' for the hook 45' engaging in. Two pairs of tabs 513' respectively extending from two sides of the opening 511', together with the side wall 51' forming a sliding slot 515' for the elastic actuating member 40' sliding therein.

Figure 8:
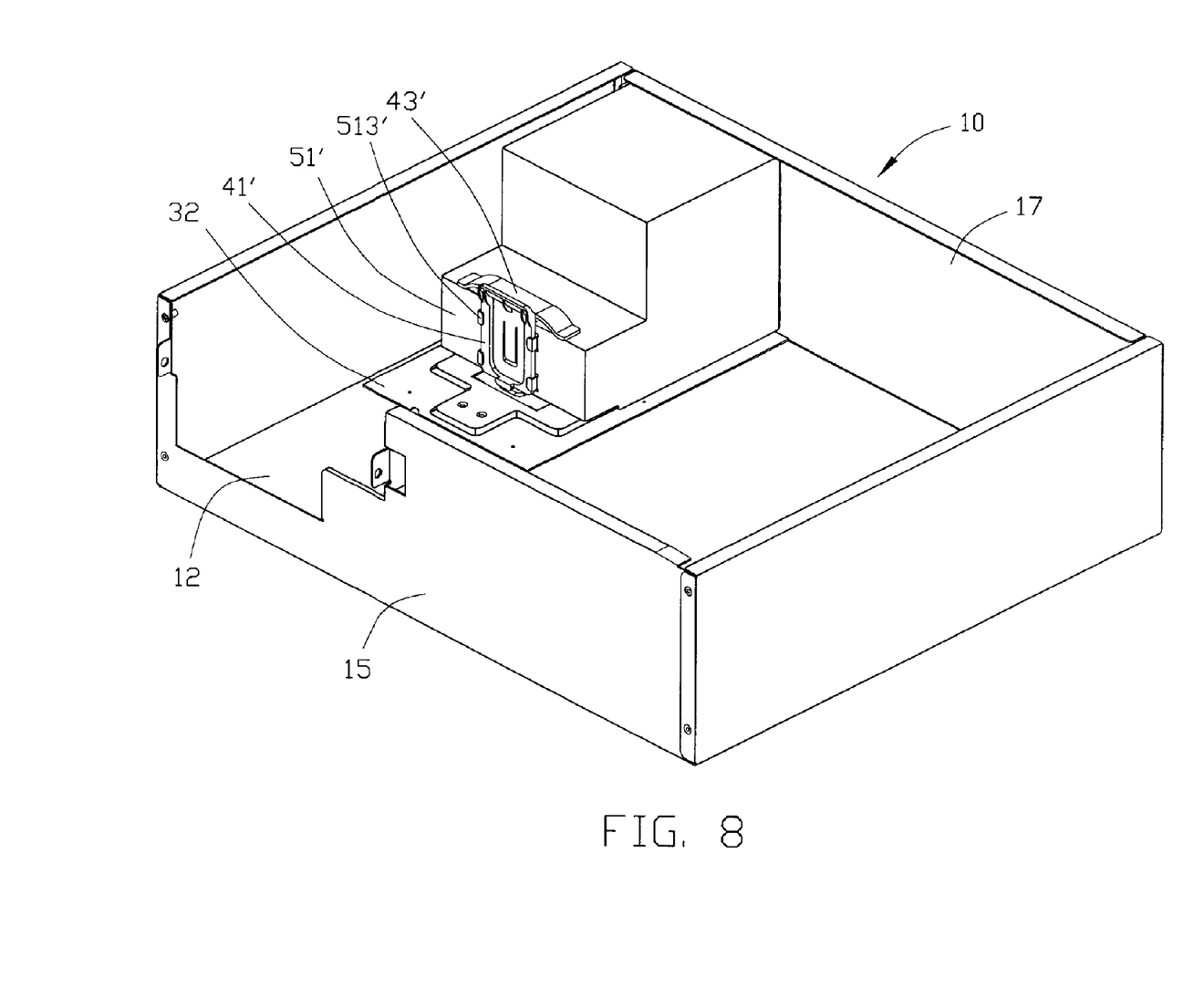
FIG. 8 is an assembled view of the mounting apparatus of FIG. 5.

Referring also to FIG. 8, in assembly, the elastic actuating member 40' slides down along the sliding slot 515'. As its sliding, the claw 453' of the hook 45' is deflected by the side wall 51. When the hook 45' aligns with the opening 511' of the side wall 51', the claw 453' rebounds to an initial state and engages in the opening 511' for preventing the elastic actuating member 40' moving upward. Meanwhile, the two free ends 431' abut on the power supply 50. Then, the power supply 50 is assembled in the chassis 10 in the same manner as the aforesaid embodiment.

In disassembly, the arcuate transversal bar 43' of the actuating member 40' is pressed down to be elastically distorted, driving the base portion 41' to move toward the blocking piece 20. The pressing portion 47' of the elastic actuating member 40' depresses the protuberance 241 of the blocking piece 20, forcing the blocking piece to lower. When the blocking piece 20 moves to a position that a top surface thereof is lower than the receiving portion 34, the power supply 50' is pulled toward the front panel 15. Then the securing openings 531' of the power supply 50' disengage from the securing members 345 respectively, thereby removing the power supply 50' from the chassis 10.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting assembly, comprising:
   a chassis having a bottom wall forming a plurality of securing members;
   a blocking piece attached to the bottom wall of the chassis, and deflectable downwards;
   a power supply comprising a bottom wall defining a plurality of securing openings for the securing members engaging therein and a blocking step abutting against the blocking piece for limiting a horizontal movement of the power supply; and
   an actuating member movably mounted on the power supply, the actuating member forming a pressing portion corresponding to the blocking piece;
   wherein when the actuating member is pushed, the pressing portion of the actuating member depresses the blocking piece so that the blocking piece is deformed along a direction perpendicular to the chassis bottom wall to free the power supply.

2. The mounting assembly as described in claim 1, wherein the elastic blocking piece comprises a pair of blocking portions protruding therefrom corresponding to the blocking step of the power supply.

3. The mounting assembly as described in claim 2, wherein the elastic blocking piece comprises a protuberance protruding therefrom corresponding to the pressing portion of the elastic actuating member.

4. The mounting assembly as described in claim 3, further comprising a carrying board forming the plurality of securing members, the carrying board defining an opening for the protuberance and the blocking portion of the elastic piece extending therethrough.

5. The mounting assembly as described in claim 1, wherein the elastic actuating member comprises a head portion and a flexural shaft extending from the head portion.

6. The mounting assembly as described in claim 5, wherein a pair of tabs is stamped from the side wall of the power supply for preventing extreme movement of the flexural shaft of the elastic actuating member.

7. The mounting assembly as described in claim 5, wherein the pressing portion protrudes from a bottom of the flexural shaft.

8. The mounting assembly as described in claim 1, wherein the elastic actuating member comprises a base portion and an arcuate transversal bar connected to the base portion.

9. The mounting assembly as described in claim 8, wherein two pairs of tabs respectively extend from the side wall of the power supply, and together with the side wall forming a sliding slot for the base portion of the elastic actuating member sliding therein.

10. The mounting assembly as described in claim 9, wherein the base portion forms an elastic hook, the side wall of the power supply defines an opening for the elastic hook engaging therein.

11. The mounting assembly as described in claim 8, wherein the pressing portion is formed from a bottom edge of the base portion.

12. An electronic device comprising:
a chassis enclosing said electronic device;
a carrying board installable inside said chassis and attachable thereto; and
a functional component installable in said chassis on said carrying board, said component releasably engagable with said carrying board in order to be retained by said carrying board in said chassis when said component abuts against said carrying board;
a blocking piece engagably retaining said component along a first direction parallel to said carrying board; and
an actuating member movably attachable to said functional component, said actuating member is movable to reach said blocking piece and urge said blocking piece to deform along a second direction perpendicular to said first direction.

13. The electronic device as described in claim 12, wherein said carrying board comprises at least one securing member to engagably retain said component along said second direction.

14. The electronic device as described in claim 12, wherein a blocking step protrudes from a bottom of said functional component, and said blocking piece comprises a pair of blocking portions protruding therefrom to engage with said blocking step in order to retain said functional component along said first direction.

15. The electronic device as described in claim 14, wherein said blocking piece comprises a protuberance protruding therefrom corresponding to said pressing portion of said elastic actuating member.

* * * * *

UNITED STATES PATENT AND TRADEMARK OFFICE
CERTIFICATE OF CORRECTION

PATENT NO. : 7,639,506 B2
APPLICATION NO. : 11/308943
DATED : December 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this

Ninth Day of November, 2010

David J. Kappos
*Director of the United States Patent and Trademark Office*